June 24, 1958  J. A. MAIN ET AL  2,840,422
WHEEL
Filed March 7, 1955  2 Sheets-Sheet 1
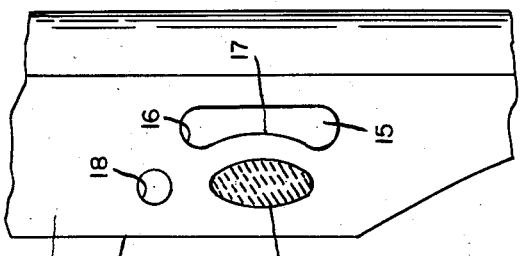
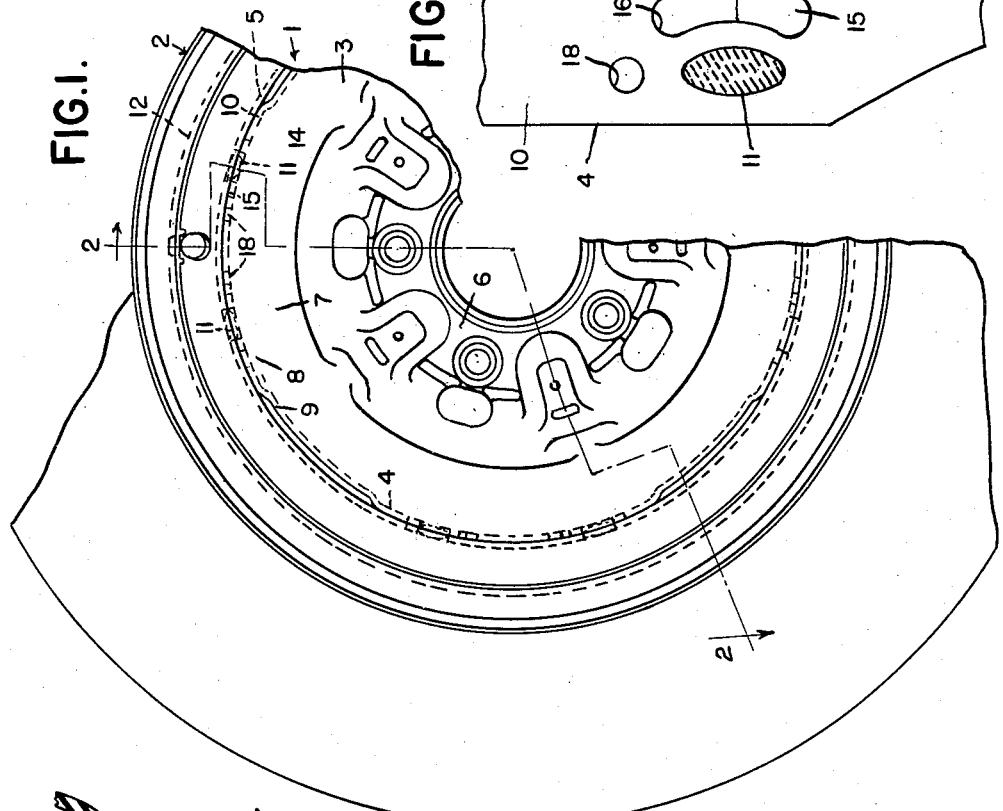
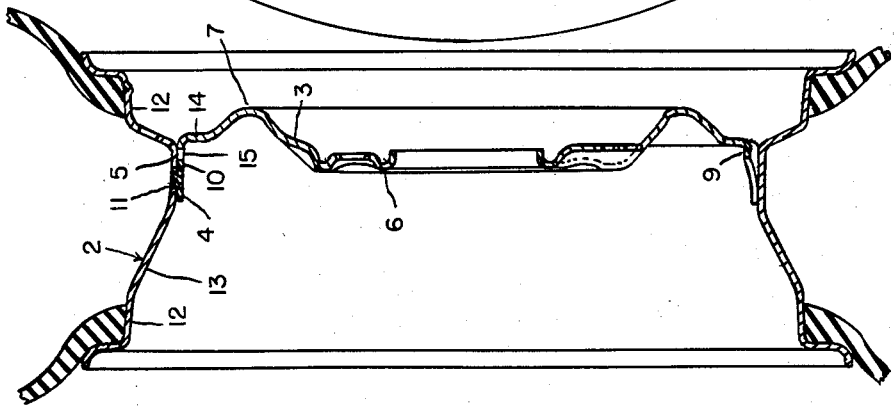
INVENTORS
JOHN A. MAIN
CHARLES W. SINCLAIR
BY
*Whittemore Hulbert & Belknap*
ATTORNEYS June 24, 1958  J. A. MAIN ET AL  2,840,422
WHEEL Filed March 7, 1955  2 Sheets-Sheet 2

INVENTORS
JOHN A. MAIN
CHARLES W. SINCLAIR
BY
ATTORNEYS

United States Patent Office

2,840,422
Patented June 24, 1958

2,840,422
WHEEL

John A. Main, Birmingham, and Charles W. Sinclair, Detroit, Mich., assignors to Kelsey-Hayes Company, a corporation of Delaware Application March 7, 1955, Serial No. 492,671

11 Claims. (Cl. 301—63)

The invention relates to wheels and refers more particularly to vehicle wheels in which the tire rims are spot welded to the wheel bodies.

The invention has for its main object to increase the life of the spot welded wheel by increasing the life of the spot welds.

The invention has for another object to so construct the wheel that the tire rim and the wheel body at the spot welds are substantially free of bending stress tending to separate the one from the other.

The invention has for a further object to so construct the wheel body that its web takes care of most of the bending stress and its flange to which the rim is spot welded controls the direction of transmission of the bending stress to the spot welds.

These and other objects will become apparent from the following description taken in connection with the accompanying drawings in which—

Figure 1 is an outboard elevation of a portion of a vehicle wheel embodying the invention;

Figure 2 is a cross-section on the line 2—2 of Figure 1;

Figure 3 is a peripheral view of a portion of the body of the wheel;

Figure 4:
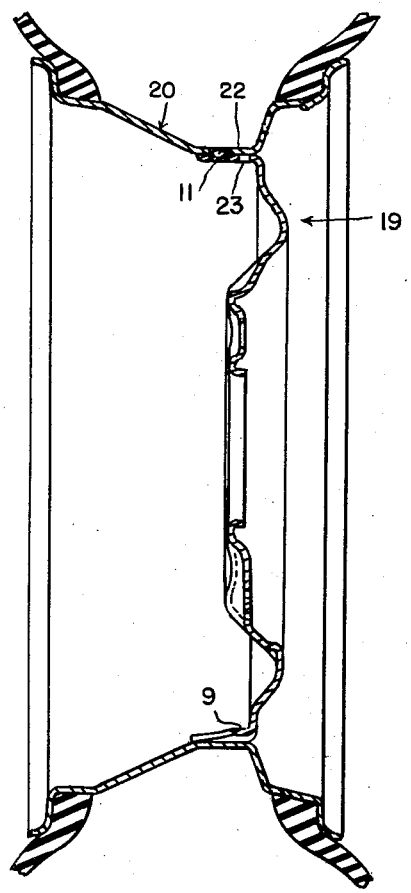
Figures 4 and 5 are views similar to Figures 2 and 3 respectively showing a modified construction.

The vehicle wheel is of the type in which the tire rim is spot welded to the wheel body. As shown, the wheel comprises the wheel body 1 and the tire rim 2, the wheel body being formed from a blank of uniform gauge and having the web 3 and the transverse flange 4 at the periphery of the web and the rim being of the drop-center type having the bottom 5 of its well encircling and spot welded to the transverse flange.

The web of the wheel body has the center bolting-on flange 6 for detachable securement to a wheel hub, the crown 7 and the spokes 8. The transverse flange is endless and has the portions 9 between and forming the edges of the spokes and the portions 10 at the radially outer ends of the spokes and of greater axial extent or length than the portions 9. The tire rim is spot welded to the flange portions 10 in angularly spaced regions near the peripheral ends of the flange portions by the spot welds 11, each of which is elliptic and elongated peripherally of the wheel.

The tire bead seats 12 of the tire rim at the opposite sides of the well are axially offset with respect to the spot welds 11 so that the spot welds are ordinarily subject during use of the wheel to bending stress tending to separate the well bottom 5 and the flange portions 10 at the spot welds and to fracture the spot welds. Also the center line of the rim which is the same as the center line of the wheel, i. e., in a radial plane at 90° to the rim axis and equidistant from the bead seats 12, is offset axially inwardly from the bottom of the well. To reduce the bending stresses so that the spot welds are substantially free of bending stress and do not fracture, the web 3 and the transverse flange 4 of the wheel body are formed to locate the spot welds 11 as near as practicable to the center line of the rim without changing the rim and are also formed so that the well bottom and the flange portions at the spot welds move substantially together without relative flexure. More particularly, the flange portions 10 are extended axially inwardly to terminate at substantially the junction of the bottom 5 of the well with the inboard side wall 13 of the well thereby making it possible to locate the spot welds as near as practicable to the axially inner edge of the well bottom. Thus, the respective lever arms about which stressing force is applied to the wheel body at the well of the rim, originating at the opposed respective bead seats 12, are more nearly equated in length, so that the loading of the weld from opposite sides is made as nearly equal as possible. Furthermore, the radially outer portion 14 of the web 3 which includes the bodies of the spokes 8 and connects the crown portion 7 of the web to the transverse flange 4 is made to extend radially and to connect into the flange portions 10 near the axially outer edge of the bottom 5 of the well so that these flange portions 10 are increased in axial extent or length in an axially outer direction. In addition, by reason of the radially outer portion 14 extending radially, the web of the wheel body has greater flexibility than the dished web of a wheel body of the same size riveted type wheel also made from a blank of uniform gauge.

Also the wheel body and particularly the transverse flange is formed to control the direction of transmission of the bending stress to the spot welds by forming the flange portions 10 with the openings 15. These openings are located between the spot welds 11 and the radial portion 14 of the web and are encircled by the bottom 5 of the well and completely concealed from the outboard side of the wheel. The openings are elongated peripherally of the wheel and are longer than the spot welds with their ends 16 extending peripherally beyond the ends of the spot welds. The ends of the openings are enlarged and the edges 17 of the openings nearer the spot welds 11 are concave and substantially uniformly spaced from the spot welds. Furthermore, the flanged portions 10 are formed with the pairs of openings 18 between and in line with the spot welds, there being one opening adjacent each spot weld and this opening being circular and having a diameter smaller than the dimension of the minor axis of the spot weld.

As a result of the above construction in which the radially outer portion 14 extends radially and the flange portions 10 have a length substantially equal to the width of the bottom 5 of the well of the rim and the parts of these flange portions connecting the same to the web 3 are of reduced cross section locally, the flexibility of the web is increased to take care of most of the bending stress by bending, the flexibility of the flange portions is increased, the direction of transmission of bending stress to the spot welds is controlled and the bending stress upon the spot welds is reduced with the result that the flange portions and well bottom at the spot welds substantially move together and fracture of the spot welds is eliminated.

Figure 5:
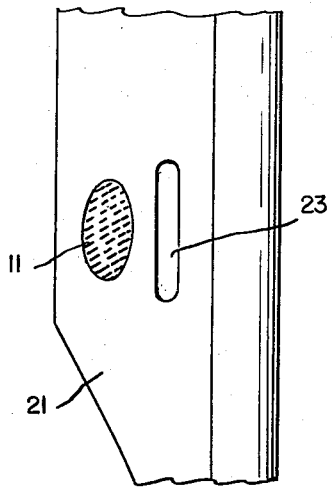

Figures 4 and 5 show a modification in which the construction of wheel body 19 and tire rim 20 is the same as that of Figures 1, 2 and 3 with the exception that the transverse flange portions 21 to which the bottom 22 of the well of the rim is spot welded are formed with the openings 23 at the web sides of the spot welds. These openings are of uniform width and have rounded ends located peripherally beyond the ends of the spot welds. The construction serves to materially decrease the bending stress upon the spot welds and to decidedly increase the life of the spot welds and, as a result, the life of the vehicle wheel.

What we claim as our invention is:

1. A vehicle wheel comprising a tire rim and a wheel body spot welded in angularly spaced regions to said tire rim, said wheel body having a web and peripheral transverse flange portions at said regions and said wheel body being formed with openings between the spot welds and at the web sides of the spot welds for controlling the direction of transmission of bending stress to the spot welds and reducing the bending stress upon the spot welds.

2. A wheel comprising a wheel body and a tire rim, said wheel body having a web provided with angularly spaced spoke portions and transverse flange portions at the radially outer ends of said spoke portions, said tire rim being spot welded to said flange portions near their peripheral ends, and said flange portions being provided with openings between the spot welds and also between said web and the spot welds for increasing the flexibility of said flange portions and decreasing the bending stress tending to fracture said rim and flange portions at the spot welds.

3. A vehicle wheel comprising a tire rim and a wheel body spot welded in angularly spaced regions to said tire rim, said wheel body having a web and peripheral transverse flange portions at said regions and said web having a radially extending annular portion connecting into said flange portions, said flange portions being provided with locally weakened zones which are offset in said regions from the spot welds thereof, thereby rendering said annular portion capable of flexing to take care of most of the bending stress to which the wheel is subject.

4. A vehicle wheel comprising a tire rim having tire bead seats and a wheel body spot welded in angularly spaced regions to said tire rim between said tire bead seats, said wheel body having a web and transverse flange portions at said regions connected to said web at the periphery of the latter, with the connecting parts of reduced cross section in locally offset relation to the spot welds to thereby increase the flexibility of said transverse flange portions and reduce the bending stress upon the spot welds.

5. A wheel comprising a wheel body and a tire rim, said wheel body having a web and angularly spaced transverse flange portions at the periphery of said rim, said tire rim being spot welded to said flange portions and said wheel body being provided with openings at the web sides of the spot welds for breaking up transmission of bending stress directly axially of the wheel body between the spot welds and said web.

6. A wheel comprising a wheel body and a tire rim, said wheel body having a web and angularly spaced transverse flange portions at the periphery of said web, said tire rim being spot welded to said flange portions and said flange portions being provided with openings between the spot welds and at the web sides of the spot welds for reducing the bending stress upon and fracture of the spot welds.

7. A wheel comprising a wheel body and a tire rim, said wheel body having a web and angularly spaced transverse flange portions at the periphery of said web, said tire rim being spot welded to said flange portions by peripherally extending elongated spot welds and said flange portions being provided with peripherally extending elongated openings between the spot welds and said web, said rim encircling the openings.

8. A wheel comprising a wheel body and a drop-center tire rim, said wheel body having a web and an endless flange at the periphery of said web provided with angularly spaced portions of greater axial extent than the intermediate portions, said tire rim having the bottom of its well spot welded to said angularly spaced portions and said angularly spaced portions having an axial length substantially equal to the width of said well bottom and being provided with openings at the web sides of the spot welds.

9. A vehicle wheel comprising a substantially imperforate tire rim and a wheel body having a radial web and an axial flange formation radially outwardly of said web at which said body is internally overlapped on and connected to said rim by circumferentially spaced spot welds, said flange formation being of reduced cross section in local zones adjacent to but offset from said respective connecting spot welds to increase the flexibility of said formation and control bending stress at said spot welds.

10. A vehicle wheel comprising a substantially imperforate tire rim and a wheel body having a radial web and circumferentially spaced axial flange portions radially outwardly of said web at which said body is internally overlapped on and connected to said rim by circumferentially spaced spot welds, said flange portions being of reduced cross section in local zones adjacent to but offset from said respective connecting spot welds to increase the flexibility of said flange portions and control bending stress at said spot welds.

11. A vehicle wheel comprising a substantially imperforate drop center tire rim having the bottom of its well offset axially from the axial center of the rim, and a wheel body having a radial web and circumferentially spaced axial flange portions radially outwardly of said web at which said body is internally overlapped on and connected to the well bottom of said rim by circumferentially spaced spot welds, said wheel body being provided with openings in said flange portions which are located axially between said spot welds and said web to increase the flexibility of said flange portions and control bending stress at said spot welds.

References Cited in the file of this patent

UNITED STATES PATENTS

| | | |
|---|---|---|
| 1,656,014 | Putman | Jan. 10, 1928 |
| 1,749,917 | Meadowcroft | Mar. 11, 1930 |
| 1,884,295 | Schwennker | Oct. 25, 1932 |
| 2,067,008 | Fergueson | Jan. 5, 1937 |